April 9, 1935.  J. B. FORSYTHE ET AL  1,997,254
AUTOMOTIVE RADIORECEIVER
Filed Sept. 23, 1932  3 Sheets-Sheet 1
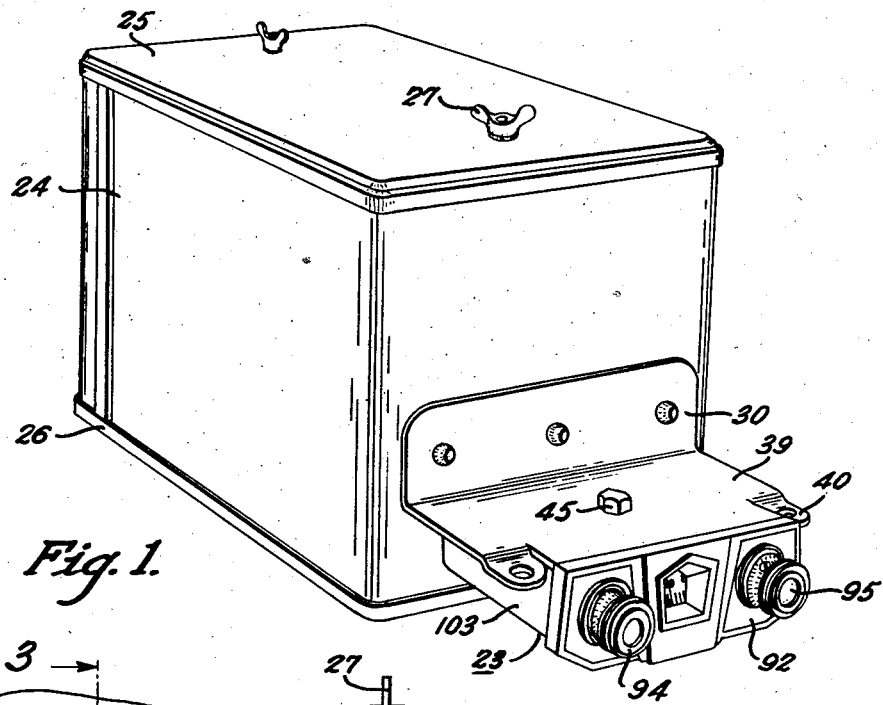
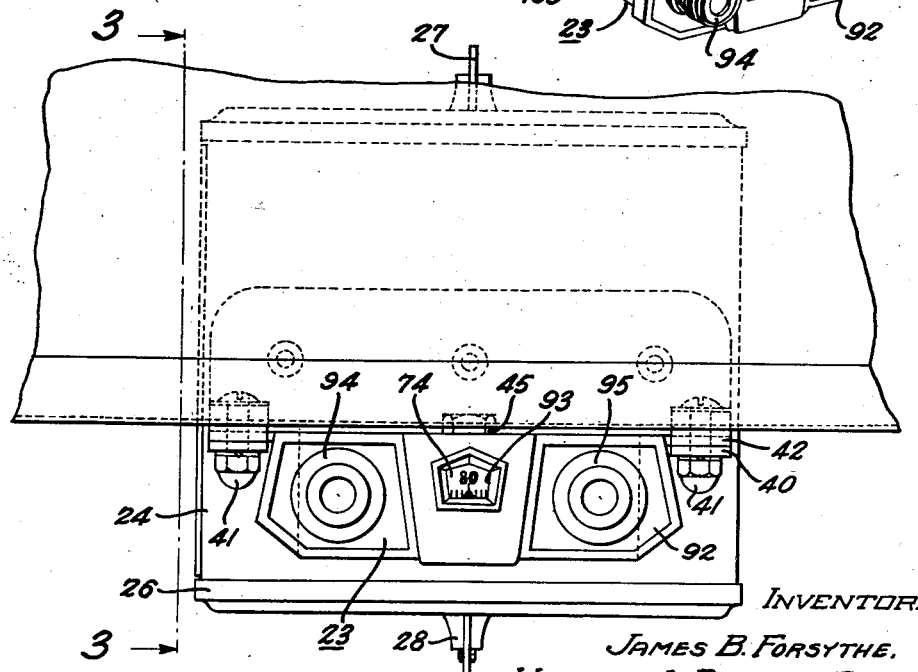
INVENTORS
JAMES B. FORSYTHE,
HERBERT L. BRUMP, & RAY C. ELLIS April 9, 1935.　　　J. B. FORSYTHE ET AL　　　1,997,254
AUTOMOTIVE RADIORECEIVER
Filed Sept. 23, 1932　　　3 Sheets-Sheet 2
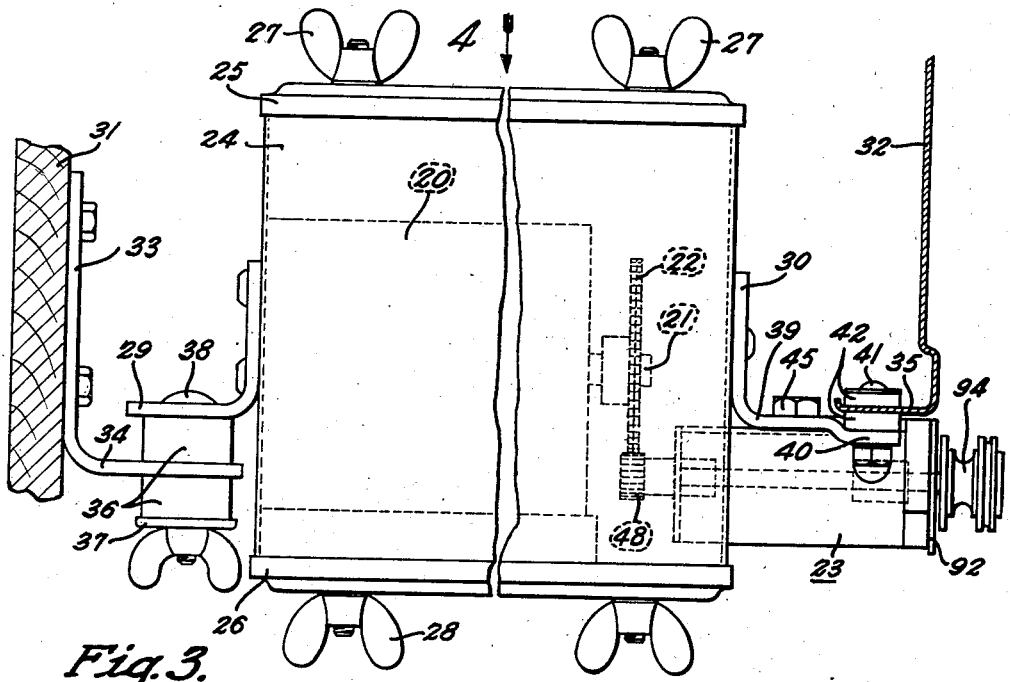
Fig. 3.
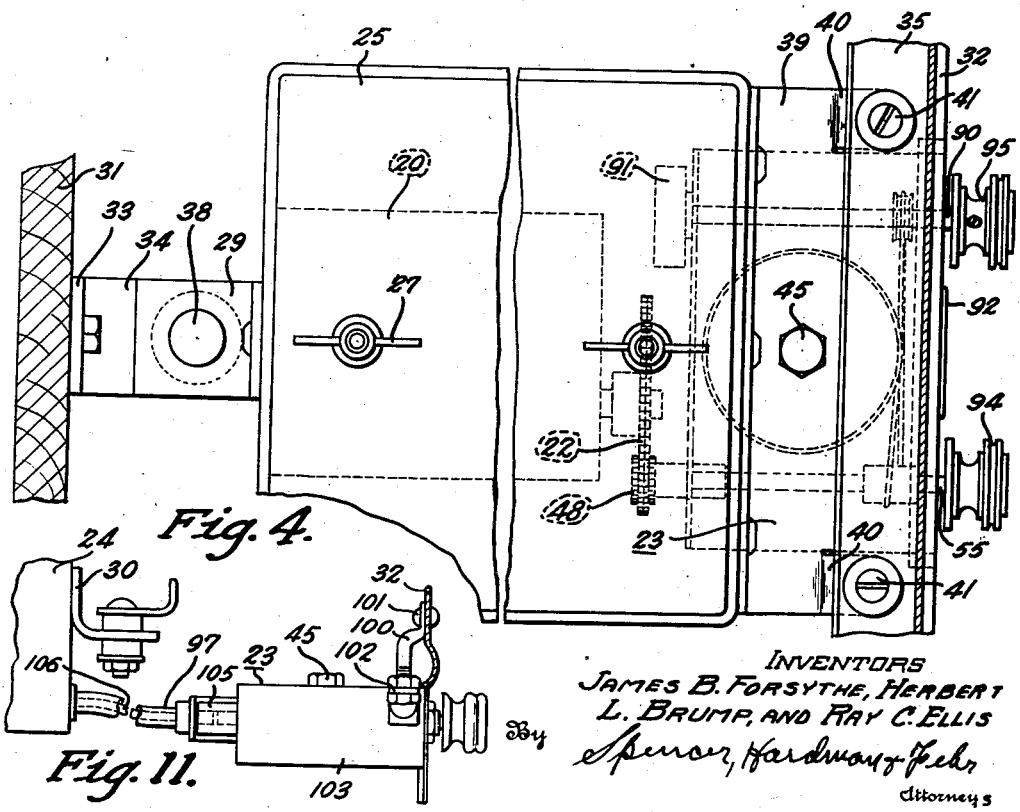
Fig. 4.
Fig. 11.
INVENTORS
JAMES B. FORSYTHE, HERBERT
L. BRUMP, AND RAY C. ELLIS
By Spencer, Hardman & Fehr
Attorneys

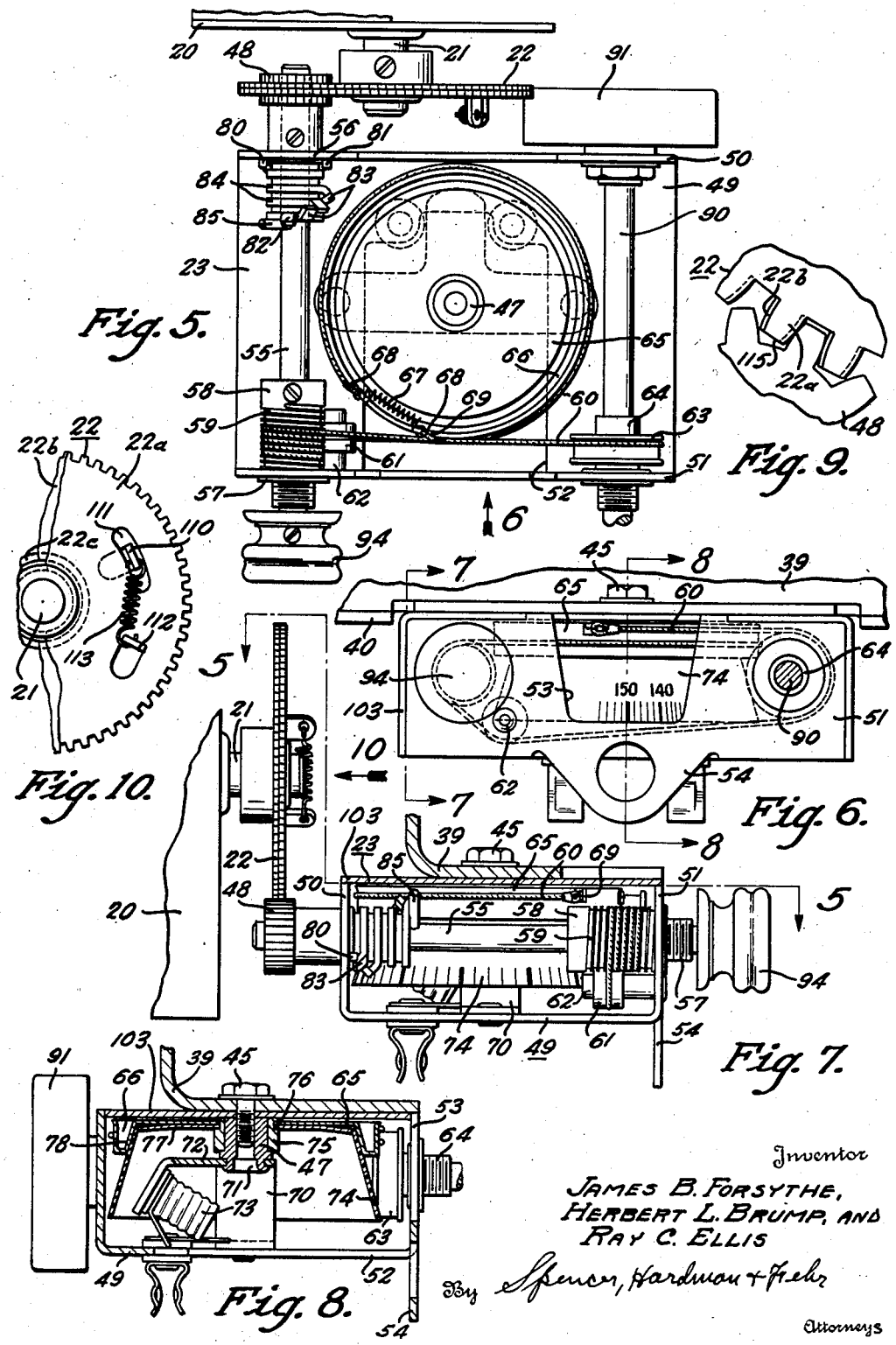

Patented Apr. 9, 1935

1,997,254

UNITED STATES PATENT OFFICE 1,997,254

AUTOMOTIVE RADIORECEIVER

James B. Forsythe and Herbert L. Brump, Dayton, Ohio, and Ray C. Ellis, Detroit, Mich., assignors, by mesne assignments, to Radio Corporation of America, New York, N. Y., a corporation of Delaware Application September 23, 1932, Serial No. 634,520

5 Claims. (Cl. 250—14)

This invention relates to radio receivers, and more particularly to the type of receiver for automotive or vehicular installation.

One of the objects of the invention is to mount a radio receiver within the body of an automotive or other vehicle so as to be conveniently accessible without being unduly conspicuous. This has been accomplished by securing a ledge to the receiver to which is fixed the selector mechanism for operating the receiver, and thence mounting the receiver and the selector mechanism behind the instrument panel or cowl board of the vehicle so that the controls of the selector mechanism are substantially coincident with the controls of the instrument panel, and closely associated therewith.

Another object of the invention is to provide means for supporting a radio receiver upon a vehicle so as to absorb the major portion of the shock that would otherwise be transmitted to the receiver. This has been accomplished by interposing vibration absorbing elements between the connection of the receiver with the said vehicle.

Another object of the invention is to provide a compact radio receiver and selector mechanism for use in a vehicle. This has been accomplished by providing a bracket or ledge for securing the receiver to the vehicle instrument panel or cowl board, and supporting a selector mechanism from said bracket so as to be accessible from the edge of the instrument panel or cowl board and operable upon the receiver mechanism, and housed at least in part by said receiver bracket.

Another object of the invention is to provide a compact selector drive mechanism for a radio receiver that may be operated with a minimum of lost motion at a point somewhat remote from the tuning mechanism of the receiver. This has been accomplished by providing a non-yielding control member and a driven member on the tunable means of said receiver to eliminate any lost motion between the control member and the driven member.

Further objects and advantages of the present invention will be apparent from the following description, reference being had to the accompanying drawings wherein a preferred embodiment of one form of the present invention is clearly shown.

In the drawings:

Fig. 1 is a perspective view of an automotive type of radio receiver disclosing the present invention.

Fig. 2 is a face view thereof disclosing the receiver and its adaptation for mounting on a vehicle.

Fig. 3 is a view of the receiver mechanism in elevation disclosing its support from the vehicle structure, and is a view substantially as indicated by the line and arrows 3—3 of Fig. 2.

Fig. 4 is a plan view of the radio receiver substantially as indicated by the arrow 4 of Fig. 3.

Fig. 5 is a detailed view showing the selector mechanism, it being a view substantially as indicated by the line and arrows 5—5 of Fig. 7.

Fig. 6 is an elevational view of the selector mechanism substantially as indicated by the arrow 6 of Fig. 5.

Fig. 7 is a side elevation of a selector mechanism with certain parts shown in section substantially as indicated by the line and arrow 7—7 of Fig. 6.

Fig. 8 is a transverse sectional view of the selector mechanism substantially as indicated by the line and arrows 8—8 of Fig. 6.

Figs. 9 and 10 are details of the drive connection between the selector mechanism and the tunable elements of the receiver.

Fig. 11 is a view illustrating a radio installation with the selector mechanism at a remote point.

With particular reference to the drawings, 20 is indicative of a radio receiver provided with a tuning shaft 21 on which is mounted a gear or gears 22 meshing with the selector mechanism 23 by which the receiver mechanism may be actuated. The receiver mechanism 20 is preferably enclosed within a casing 24 having removable covers 25 and 26 held thereon by screw devices 27 and 28 respectively. To opposite walls of the casing 24 are fixed brackets 29 and 30 by which the receiver structure may be supported from a pair of substantially parallel or spaced walls 31 and 32. For convenience in such mounting a supporting bracket 33 is secured to the wall 31 and has an angular extension 34 for support of one side of the radio receiver mechanism as is illustrated in Figs. 3 and 4. As regards the wall 32 this may have an angular flange 35 to which the bracket 30 may be attached. In securing the casing 24 to these supports vibration absorbing members, which may be sponge rubber or an equivalent structure 36 are inserted between the brackets 29 and 34 and between the bracket 34 and a clamp washer 37 so that a bolt and screw device 38 may operate to firmly hold the bracket 29 to the bracket 34 in any desired manner.

Following out this method of support the bracket 30 has its angular extension 39 provided with apertured lugs 40 that substantially overlap with respect to the flange 35 of the wall member 32 and make provision for the reception of a screw and nut device 41 for supporting this end of the radio receiver. Vibration absorbing members 42 are placed on either side of the flange 35 so that one of the same will be interposed between it and the attaching lug 40. By this construction provision is made for the ready mounting and removal of a radio receiver in the available space of a vehicle so as to position the instrument for convenient accessibility to an attendant with the elimination of undesirable noise due to installation and that will effectively dampen the translation of vehicular vibration to the receiver mechanism. Provision is also made for compact arrangements of the drive mechanism since the controls of the radio receiver are in close association with the controls of the instrument panel of the vehicular structure and are in a plane substantially therewith. The casing having the readily removable covers 25 and 26 provide access to the structure within the casing 24 such as for servicing or repairs which in many instances may be accomplished without removing the receiver from the vehicle.

The selector mechanism 23 is disclosed in detail in Figs. 5 to 8 inclusive, and is supported from the bracket 30 by means of a screw or similar device 45 passing through the angular extension 39 of the bracket 30 and received by a part 46 or 47 of the said selector mechanism as indicated in Figs. 3 and 8 respectively. The selector mechanism is a compact one and when thus secured to the ledge 39 is so connected with the casing 24 that a driven pinion 48 is in meshing relation with the gear or gears 22 fixed to the tunable shaft 21 and hereinbefore referred to. The selector mechanism comprises a substantially U-shaped bracket or channel member 49 having parallel flanges 50 and 51 and the bridge or web portion cut away substantially as at 52. The flange 51 is apertured as at 53 to provide a window-way, and may include an apertured lug 54 for the reception of a lock switch mechanism. A control shaft 55 is provided so as to drive the pinion 48 and has appropriate journals in the flanges 50 and 51 as at 56 and 57 respectively. Mounted on the control shaft 55 near the flange 51 is a windlass 58 grooved as at 59 for the reception of a cord or cable 60 that is trained over an idler 61 mounted on a stud 62 carried by the flange 51, and thence looped about a second and larger idler 63 carried by a sleeve 64 secured to the flange 51, after which the cord or cable 60 is trained about and secured in driving relation to a drum 65. The drum 65 has a recess portion 66 for the reception of a tensioning spring 67 hooked to the ends 68 of the cable 60 which operates to take up all slack or keep the same taut. The flange of the drum 65 may be notched as at 69 to allow for the passage of the connection of the cable and thus provides a positive hook up between the cable and the drum which it drives. Fixed to the web of the frame 49 is a bracket member 70 that supports a threaded stud 71 forming a pivot post for the drum 65, and constituting the part 47 that cooperates in securing the mechanism 23 to the ledge 39 as hereinbefore described. The bracket 70 provides an arm 72 that supports a lamp receptacle 73 designed to illuminate a dial member 74 carried by the drum 65 in close juxtaposition to the window-way 53 and which will be caused to move across the same upon movement of the drum 65. Facilitating this a hub 75 is journaled upon the stud 71 and receives at a shoulder portion 76 a clamping disc 77 and the coaxial aperture of the drum 65. The drum 65 is fashioned to provide the tapering walls 78 for the reception of a dial strip 74 which is retained therein by disc 77 substantially as illustrated in Fig. 8. The disc 77 is of such diameter as respects the recess mentioned that when the dial strip 74 is placed against the wall 78 and the disc 77 placed within this assembly and drawn down upon the shoulder portion 76 of the hub 75 that the disc 77 will so firmly engage the dial strip 74 as to prevent its ready removal, and thus cause the dial strip 74 to move with the drum 65 in response to actuation of the control shaft 55.

As before stated the control shaft 55 is drivingly connected to the pinion 48, after it passes through the bearing 56 supported by the flange 50 of the frame 49. In order to limit the amount of rotation that may be given to the shaft 55 stop pins 80 and 81 are set into the flange 50 at a convenient place near the bearing 56 so that they will cooperate with the offset lugs 82 or 83 carried by one of the rotation limiting washers 84. These rotation limiting washers or stop washers 84 are of a design illustrated in Fig. 5 and are substantially identical in formation, each washer having a pair of radially extending lugs that are deflected from the plane of the washer such that each lug 82 and 83 will project on opposite sides of the plane of said washer. When these washers are placed upon the control shaft as illustrated in Fig. 5, the offset lug of one washer will obviously be disposed substantially in overlapping relation with the oppositely extending offset lugs of an adjacent washer and thus provides for the exact limiting of rotative movement that may be given to the shaft 55, depending only upon the number of stop washers that are used and the positioning of the stop pins 80 and 81 in the flange 50 and the cooperation of a stop pin 85 set in the shaft 55. As an example in the illustrated embodiment the stop mechanism is so proportioned as to provide a range of rotation for the shaft 55 to the amount of about three and three-fourths complete revolution. Obviously the range of rotation may be varied if so desired by changing the position of the stops 80 and 81, or if the change of limits amounts to a great one it may be accomplished by change in the number of stop washers assembled.

As before stated the sleeve 64 supports the idler 63, and it also makes provision for the journaling of the second control shaft 90 that has a second bearing in the flange 50 and is operable to actuate a volume control element 91 which has its connection in the receiver in the usual way. An escutcheon plate 92 may be secured to the bracket 39 or the frame member 49 as may be desired and so as to properly cover the window-way 53 yet having an aperture 93 for the inspection of the dial 74 all as is substantially shown in Figs. 1 to 4 inclusive. The escutcheon plate is secured in place by nuts or like devices threaded on the members 57 and 64, so that the control knobs 94 and 95 passing therethrough make provision for actuating the mechanism of the receiver.

Connection of the selector mechanism with the receiver may be accomplished directly as illustrated in Figs. 1, 3, 4, 5 and 6, as the connection may be a remote one as illustrated in Fig. 11, where the selector mechanism 23 is secured to the instrument panel 32 in the usual way and has a flexible cable, shaft or other connector 97 communicating its motion to the mechanism within the case 24 through the gear connections 22 and 48. The selector 23 may be supported by means of spade bolts 100 fixed to the instrument panel 32 as at 101 and passing through apertured ears or lugs 102 provided by a cover member 103. In the latter form of installation, the pinion 48 is separated or spaced from the selector mechanism 23, and a coupling member 105 is secured to the shaft 55 in its stead which member has driving connection with an element 106 housed within the connector 97 and that ultimately is drivingly secured to the pinion 48 within the case 24.

Whether the connection between the selector mechanism be direct or remote the engagement of the pinion 48 and gear 22 is such as to eliminate back lash and to prevent any lost motion that might otherwise be present and thereby prevent accurate and synchronized movement between the station indicator and the tunable members of the receiver. This is accomplished by splitting the gear 22 into two parts 22a and 22b, the first of which is rigidly fixed to a hub member 22c while the other is capable of relation thereon. The amount of relative rotation of the gear parts 22a and 22b is limited by spring post 110 of the part 22b projecting through a slot 111 of the part 22a. A similar spring post 112 is struck out from or provided on the gear part 22a and makes provision for the anchorage of a spring 113 for the relative rotative biasing of the gear parts 22a and 22b. This construction provides a gear with somewhat expansible teeth 115 for meshing with, and substantially filling the space between the teeth of the pinion 48, so that any movement of the control mechanism will be immediately transmitted to shaft 21 to be moved.

While the form of embodiment of the present invention as herein disclosed, constitutes a preferred form, it is to be understood that other forms might be adopted, all coming within the scope of the claims which follow.

What is claimed is as follows:

1. In an automotive radio receiver, a casing within which the receiver is enclosed, a selector mechanism for said receiver comprising an attaching bracket external said casing secured thereto, a control shaft journaled in said bracket, and means for imparting the movement of said control shaft to a tuning element of said receiver located within said casing, cooperating provisions carried by said bracket and control shaft for limiting the movement of said shaft, and means provided by said receiver casing and said bracket for supporting the radio receiver upon an automotive vehicle.

2. A radio receiver adapted to be installed on a motor vehicle or the like between the motor board and the instrument panel comprising a casing adapted to form an enclosure for the receiver proper including the tuning elements thereof, a bracket secured to the receiver casing, a cooperative bracket secured to the motor board and means for resiliently attaching said two brackets one to the other, a ledge mounted on said receiver casing oppositely to said bracket, said ledge provided with apertured ears and means including a cooperating element for resiliently connecting said apertured ears to said instrument panel, a selector mechanism for said tuning elements including a controller carried by said ledge and operatively connected to the receiver tuning elements, indicating means carried by said ledge and means connecting said controller and indicating means whereby said indicating means may respond to the movements of said controller.

3. A radio receiver adapted to be installed on a motor vehicle or the like between the motor board and the instrument panel comprising, a casing adapted to form an enclosure for the receiver proper including the tuning elements thereof, a bracket secured to the receiver casing, a cooperating bracket secured to the motor board and means for resiliently attaching said two brackets one to the other, a ledge mounted on said receiver casing oppositely to said bracket said ledge being provided with apertured ears and means including a cooperating element for resiliently connecting said apertured ears to said instrument panel, a selector mechanism for said tuning elements including a controller carried by said ledge and operatively connected to the receiver tuning elements, indicating means carried by said ledge, a second controller carried by said ledge and adapted to cooperate with the volume control means of said receiver, said two controller elements including a pair of parallel shafts mounted on said ledge, an idler mounted on the shaft of said volume control controller element, indicating means carried by said ledge and means comprising a cable wound around the shaft of the first controller element and around said idler and adapted to cooperate with said indicating means, said cable being adapted to transmit movements of the first named controller element to the indicating means whereby said latter may respond to movements of said controller.

4. In an automotive radio receiver enclosed within a casing, said receiver being provided with at least one tuning element within said casing, a bracket external said casing but secured thereto said bracket providing means by which the receiver may be supported, a controller mechanism mounted directly on said bracket, connections through said casing between the tuning element of said receiver and said controller mechanism indicating means carried by said bracket and means connecting said controller and said indicating means whereby the indicator may respond to the movement of the controller.

5. In an automotive receiver enclosed within a casing, said receiver being provided with at least one tuning element within the casing, a bracket secured to an outer face of the receiver casing and provided with means by which the receiver casing may be supported, a controller mechanism mounted directly on said bracket, connections through said casing between the tuning element of the receiver and the controller mechanism, indicating means carried by said bracket external the casing and movable in response to said controller, an escutcheon plate for the indicator and means for supporting the receiver and its control mechanism with said escutcheon plate substantially coincident with the plane of an instrument panel of an automotive vehicle.

RAY C. ELLIS.
JAMES B. FORSYTHE.
HERBERT L. BRUMP.